US012800012B2

(12) United States Patent
Tsao

(10) Patent No.: US 12,800,012 B2
(45) Date of Patent: Nov. 17, 2026

(54) MICRO-DISPLACEMENT ACTUATOR MECHANISM

(71) Applicant: Che-Chih Tsao, Hsinchu (TW)

(72) Inventor: Che-Chih Tsao, Hsinchu (TW)

( * ) Notice: Subject to any disclaimer, the term of this patent is extended or adjusted under 35 U.S.C. 154(b) by 0 days.

(21) Appl. No.: 19/243,893

(22) Filed: Jun. 20, 2025

(65) Prior Publication Data

US 2026/0168562 A1 Jun. 18, 2026

Related U.S. Application Data

(60) Provisional application No. 63/661,950, filed on Jun. 20, 2024.

(51) Int. Cl.
*F16H 21/16* (2006.01)

(52) U.S. Cl.
CPC .................................... *F16H 21/16* (2013.01)

(58) Field of Classification Search
CPC .. F16H 21/16; B25J 7/00; B25J 9/0015; B25J 17/0266; H02N 2/043
USPC .................................... 74/25, 10.9, 68, 469
See application file for complete search history.

(56) References Cited

U.S. PATENT DOCUMENTS

| | | | | |
|---|---|---|---|---|
| 11,307,406 | B2 * | 4/2022 | Tsao | G02B 26/101 |
| 11,476,406 | B2 * | 10/2022 | Mizuuchi | H02N 2/043 |
| 2002/0005679 | A1 * | 1/2002 | Elings | H02N 2/043 29/25.35 |
| 2020/0141762 | A1 * | 5/2020 | Tsao | G01D 5/145 |

* cited by examiner

*Primary Examiner* — Jake Cook

(57) ABSTRACT

A low-cost precision micro-displacement actuator combines an Uneven-Legs Tilting mechanism with at least one parallel four-bar linkage to provide a very small tilt angle of one member of the Uneven-Legs Tilting mechanism, in response to an input of a finite linear or rotational displacement to the mechanism. The input of finite linear or rotational displacement is easy to generate and to control. The small tilt angle of the member results in a micro-displacement of an output position on the member.

5 Claims, 3 Drawing Sheets

MICRO-DISPLACEMENT ACTUATOR MECHANISM

CROSS REFERENCE TO RELATED APPLICATIONS

This application claims the benefit of provisional patent application Ser. No. 63/661,950, filed on Jun. 20, 2024, by the present inventor, which is incorporated by reference in its entirety.

BACKGROUND OF THE INVENTION

1. Field of the Invention

The present invention relates to actuator mechanisms for micro-displacement and its applications.

2. Background

Precision micro-displacement actuators are useful for machine stages in measurement instrument or processing equipment that requires minute but precise movement. Typical existing micro-displacement actuators include mechanical translation or rotational stages based on precision lead screws, linear motors in combination of precision linear scales such as optical scale and linear or rotational actuator based on piezoelectric materials. Mechanical translation/rotational stages and linear motors are complicated and expensive. Piezoelectric actuators require high voltages to operate and the power supply module can be of significant size compared to the actuators themselves. To obtain long displacement while maintaining precision, a significant number of piezoelectric blocks need to be stacked together, which adds to complexity and costs.

BRIEF SUMMARY OF THE INVENTION

This invention describes a mechanism that can be actuated by a common actuator of regular precision from its input end but still achieve high precision micro-displacement at its output end. That is, the mechanism in combination with a regular actuator, which generally costs less than many existing high precision actuators, becomes a low-cost precision micro-displacement actuator.

The micro-displacement actuator mechanism is based on an Uneven-Legs Tilting (ULT) mechanism in combination with at least one parallel four-bar linkage. The Uneven-Leg Tilting mechanism can provide a very small tilt angle from an input of a finite linear or rotational displacement that is easy to generate and to control. By the micro-displacement actuator mechanism, this very small tilt angle can be transformed into a micro-displacement. The ULT mechanism is basically a 4-member linkage (four-bar linkage) with a top member connected to a first leg member at one end and a second leg member at the other end. The two leg members are connected to a base member respectively. The two leg members are of different lengths (uneven lengths). The connections between these 4 members are by rotatable joints. When one end of the top member is displaced laterally by an input displacement, the two leg members rotate by slightly different angles, which result in a tiny amount of rotation of the top member.

In one preferred embodiment, the ULT mechanism is placed side by side with a parallel four-bar linkage mechanism. The first leg member of the ULT mechanism is fixed, in parallel, to a first bar of the four-bar linkage mechanism. The first leg member and the first bar are of the same length and have their rotatable joints in corresponding positions aligned coaxially. The base member of the ULT mechanism is fixed to a second bar of the four-bar linkage mechanism. The second bar is at a position corresponding to the base member and is connected to one end of the first bar. A third bar of the parallel four-bar linkage mechanism, locating opposite to the second bar, is mounted and fixed to a base frame. By this arrangement, when one end of the base member is displaced laterally by an input displacement, the two leg members rotate by slightly different angles, which result in a tiny amount of rotation of the top member and a tiny, reduced amount of an output displacement relative to the base frame in a direction basically perpendicular to the input displacement.

In another preferred embodiment, the ULT mechanism is sandwiched between two parallel four-bar linkage mechanisms. The two parallel four-bar linkage mechanisms at the sides of the ULT mechanism are aligned and fixed to the ULT mechanism in the same way as described in the embodiment of using only one parallel four-bar linkage mechanism. The two parallel four-bar linkage mechanisms are mounted and fixed to a base frame also the same way.

The rotatable joints connecting the members and bars in the ULT mechanism or in the parallel four-bar linkage mechanisms can be flexural joints or can be repeatable Hertzian contact joints.

DETAILED DESCRIPTION

The invention can be better understood through the detailed descriptions and examples of embodiments below.

This invention describes a mechanism that can be actuated by a common actuator of regular precision from its input end but still achieve high precision micro-displacement at its output end. That is, the mechanism in combination with a regular actuator, which generally costs less than many existing high precision actuators, becomes a low-cost precision micro-displacement actuator.

Figure 1:
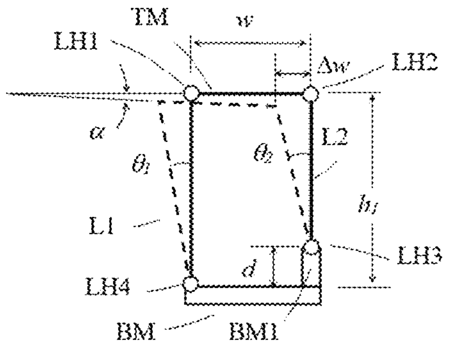
FIG. 1 depicts the principle of an Uneven-Legs Tilting mechanism used in this current invention.

The micro-displacement actuator mechanism is based on an Uneven-Legs Tilting (ULT) mechanism. Referring to FIG. 1, the illustrated ULT mechanism is in principle a 4-member linkage, with a top member (TM) supported on two parallel legs (leg members) (L1, L2) joined to a base member (BM), which are connected with four rotatable joints (or hinges) (LH1, LH2, LH3, LH4). The lengths of the two legs L1 and L2 have a difference of d, as facilitated by a protruded part of the base member BM1, as depicted in FIG. 1. With this length difference of d, when the ULT mechanism tilts to one side, the two legs rotate by two slightly different angles ($\theta_1$, $\theta_2$) and the vertical heights of the top ends of the two legs change differently. Because the top ends of the two legs are connected to the two ends of the top member TM at the two rotatable joints LH1 and LH2, the tilting of the ULT mechanism results in a differential displacement between the two ends of the top member that rotates the top member TM by a small angle (α), as depicted in FIG. 1.

The ULT mechanism can have a very significant mechanical reduction effect on the rotation of the top linkage member TM. Geometric analysis of FIG. 1 gives the following expression of tilting angle α:

By making use of the very small rotation angle of the top member TM of the ULT mechanism, a desired precision micro-displacement can be created. FIG. 3A depicts a ULT mechanism redrawn based on FIG. 1. For example, if $h_1$=50 mm, d=5 mm, w=50 mm, lateral input displacement Δw=1 mm, when the top member TM rotates an angle of α about the hinge LH1, then h/w=1, $\Delta w/h_1$=0.02 and $d/h_1$=0.1. From the chart in FIG. 2, a value of tan α=$2\times10^{-5}$ can be determined and the micro-displacement of the hinge LH2 at the other end of the top member can be determined as $$d_{m,LH2} = w\tan\alpha = 50\,\mathrm{mm}\times 2\times 10^{-5} = 1\,\mu\mathrm{m} = 1000\,\mathrm{nm}$$

$$\alpha = \cos^{-1}\frac{w^2+h_2^2-A^2}{2wh_2} + \cos^{-1}\frac{A^2+h_2^2-w^2}{2Ah_2} + \cos^{-1}\frac{B^2+A^2-h_1^2}{2BA} - \tan^{-1}\left(\frac{d}{w}\right) - \pi \qquad (2)$$

$$A = \sqrt{B^2+h_1^2-2Bh_1\cos\left(\pi-\tan^{-1}\left(\frac{d}{w}\right)-\cos^{-1}\frac{\Delta w}{h_1}\right)}$$

$$B = \sqrt{d^2+w^2}$$

where $h_1$ and $h_2$ ($h_2=h_1-d$) are the lengths of the two legs (L1, L2) respectively and ω is the length of the top member TM as well as the horizontal width of the base member BM, Δw is a lateral displacement that enables the tilting, and the rest of the symbols are marked on FIG. 1.

Assuming the lateral (horizontal) displacements at the top of the two legs are the same, because their difference is very small since is α small, an approximate and simplified expression can be derived:

$$\alpha = \sin^{-1}\left[\frac{h_1}{w}\left((\cos\theta_1-\cos\theta_2)+(d/h_1)(\cos\theta_2-1)\right)\right] \qquad (3)$$

$$\theta_1 = \sin^{-1}(\Delta w/h_1)$$

$$\theta_2 = \sin^{-1}\left(\frac{\Delta w/h_1}{1-d/h_1}\right)$$

For a of small angles, the error by the simplified eqn. (3) is very small. For error up to 1%, α has to go up to 2.25°, which is way over the range of small angles of α.

Figure 2:
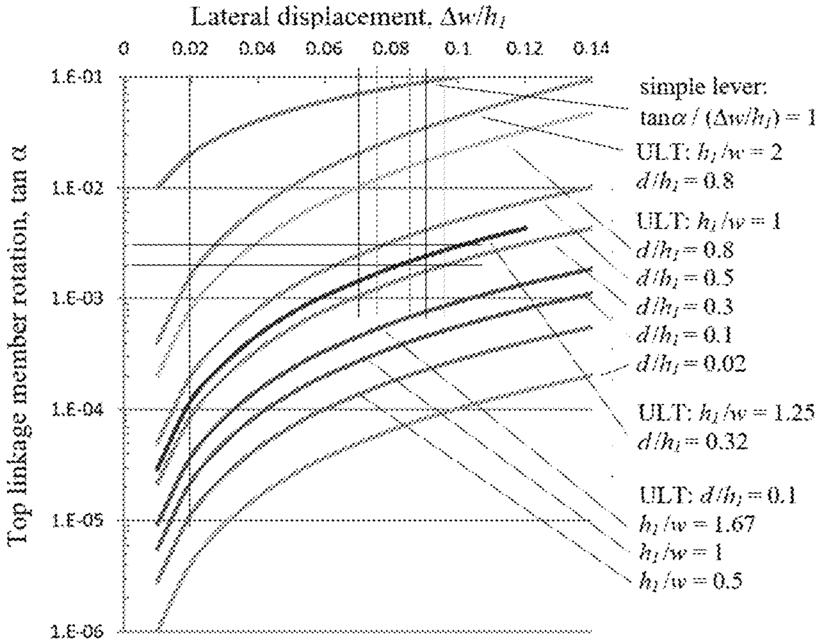
FIG. 2 shows a chart of angle of rotation of the top member of the Uneven-Legs Tilting mechanism of FIG. 1 under different designs of geometric parameters and lateral input displacement amounts.
Figure 3A:
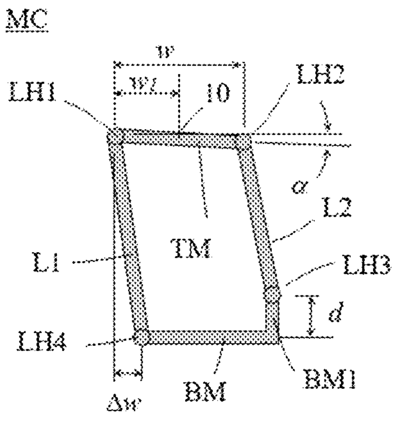
FIG. 3A, FIG. 3B and FIG. 3C depict the component mechanisms of the current invention.

FIG. 2 shows the angle α, more precisely tan α, of the top member rotation in relation to the lateral displacement Δw as calculated from eqn. (3), in comparison with a simple lever mechanism. It can be seen that by adjusting the ratios of geometric parameters including the lengths of the top member (w) and the difference of leg lengths with respect to the leg length ($d/h_1$) and setting proper lateral displacement ($\Delta w/h_1$), the ULT mechanism can generate rotation angles covering a very wide range from over 10 milli-radian down to a few micro-radian by the same magnitudes of lateral displacement. Compared to a simple lever mechanism, the ULT mechanism generated rotation angles can be up to 4 orders of magnitude smaller (or 1/10,000× times). Further, if the lengths of the top member w and of the legs ($h_1$ and $h_2$) are of a few centimeters, then the corresponding lateral input displacement Δw has a range from several hundred micrometers to a few millimeters, which can be easily generated by using a regular, comparatively low cost actuator.

If an actuation point 10 is located at a distance of $w_1$ measured from the hinge LH1 along the horizontal direction, the actuation point 10 will have a basically downward micro-displacement $$d_{m,10} = w_1\tan\alpha$$

Assuming $w_1$=10 mm, then the actuation point has a downward micro-displacement $$d_{m,10} = w_1\tan\alpha = 10\,\mathrm{mm}\times 2\times 10^{-5} = 1\,\mu\mathrm{m} = 200\,\mathrm{nm}$$

That is, by making use of the ULT mechanism, an input lateral displacement Δw of 1 mm can be reduced to an output micro-displacement of 200 nm. In general, it is comparatively easy to generate a lateral input displacement on the order of 1 mm with a resolution or accuracy of about 0.025 mm using a regular actuator, such as a servo motor for RC (radio-controlled) models, which costs much less than US$100. The corresponding output micro-displacement will then have a resolution/accuracy on the order of about 5 nm, which is very precise.

If we observe the functioning of the ULT mechanism in FIG. 1, we see that the LH1 location moves when the mechanism tilts if the base member BM is fixed. In order to make use of the ULT mechanism for the above purpose, additional mechanisms are needed to keep the hinge LH1, which is the reference point for measuring the output micro-displacement of point 10 in the vertical direction, at a fixed location. Further, the base member BM should maintain its orientation, i.e., no rotation, when the ULT mechanism tilts. These two requirements, stationary LH1 and non-rotating BM, can be achieved by combining the ULT mechanism with at least one parallel four-bar linkage mechanism.

Figure 3B:
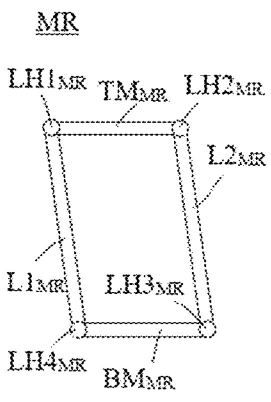
Figure 3C:
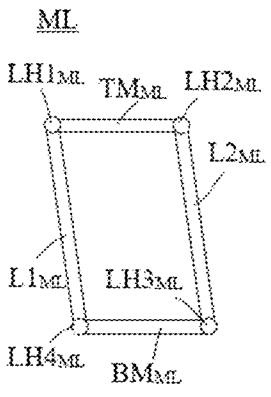
Figure 4A:
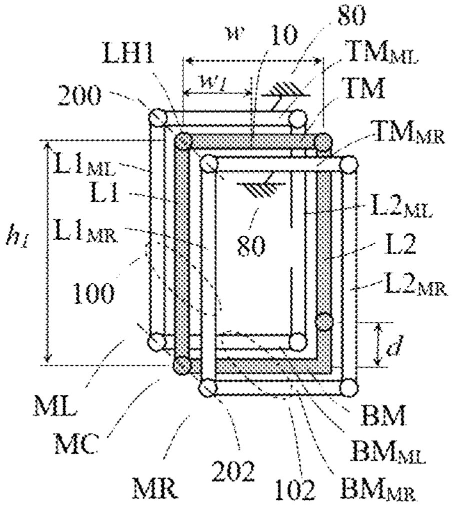
FIG. 4A, FIG. 4B depict and explain the assembly and operations of the current invention in the form of an Uneven-Legs Tilting mechanism sandwiched between two parallel four-bar linkage mechanisms.
Figure 4B:
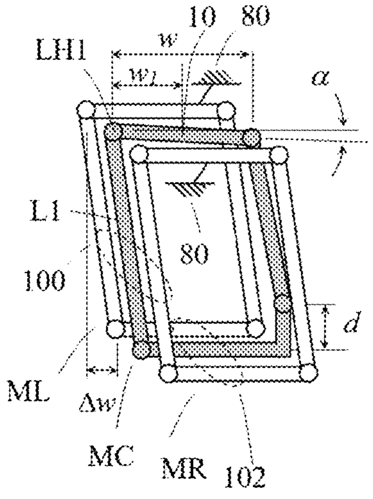

FIG. 4A and FIG. 4B depict the first example of the Micro-Displacement Actuator Mechanism. This example applies two parallel four-bar linkage mechanisms to sandwich one ULT mechanism in between to achieve the required functions. The ULT mechanism MC is of the same mechanism as depicted in FIG. 3A. The two parallel four-bar linkage mechanisms are depicted in FIG. 3B and FIG. 3C, as the left mechanism (ML) and the right mechanism (MR), and are identical in structure. As parallel linkages, the lengths of the two legs of each mechanism ($L1_{ML}$, $L2_{ML}$, $L1_{MR}$, $L2_{MR}$) are equal and the length of the top members and the base members ($TM_{ML}$, $BM_{ML}$, $TM_{MR}$, $BM_{MR}$) are also equal. Further, on the ULT mechanism MC, the length of the leg L1 is equal to the length of the legs $L1_{ML}$ and $L2_{ML}$ on the parallel four-bar linkage mechanisms; and the length of the base member BM is also equal to the length of the base members $BM_{ML}$ and $BM_{MR}$ on the parallel four-bar linkage mechanisms.

When the Micro-Displacement Actuator Mechanism is assembled, the ULT mechanism MC is sandwiched in between the two parallel four-bar linkage mechanisms with all the three L1 legs (L1, $L1_{ML}$, $L1_{MR}$) joined together in parallel, as indicated at 100 in FIG. 4A, with the rotational axes of their hinges, LH1, $LH1_{ML}$ and $LH1_{MR}$, aligned coaxially, as indicated at 200 in FIG. 4A, and also with all the three base members (BM, $BM_{ML}$, $BM_{MR}$) joined together in parallel, as indicated at 102 in FIG. 4A, with the rotational axes of their hinges, LH4, $LH4_{ML}$ and $LH4_{MR}$, aligned coaxially, as indicated at 202 in FIG. 4A. Further, the two top members $TM_{ML}$ and $TM_{MR}$ are attached and fixed to a base frame, as indicated at 80 with a simplified symbol. But the top member TM and the leg L2 of the ULT mechanism MC are not joined to the two parallel four-bar linkage mechanisms nor to the base frame. With this arrangement, when a lateral input displacement Δw is applied, as depicted in FIG. 4B, the original tilting motion of the ULT mechanism becomes a motion of rotation of the leg L1, together with the joined legs $L1_{ML}$ and $L1_{MR}$, about the reference position of the hinge LH1. The position of the axis of the hinge LH1 does not move because it is co-axial with the hinges $LH1_{ML}$ and $LH1_{MR}$ of the two top members $TM_{ML}$ and $TM_{MR}$ that are fixed. The orientation of the base member BM does not change because it is joined to the base members $BM_{ML}$ and $BM_{MR}$ at its two sides and the orientations of these two base members do not change because they are part of the two parallel four-bar linkage mechanisms and they are always parallel to the fixed top members $TM_{ML}$ and $TM_{MR}$.

Thus, the two requirements, stationary LH1 and non-rotating BM, are achieved and the output micro-displacement at location 10 is a displacement relative to the fixed two fixed top members $TM_{ML}$ and $TM_{MR}$, also relative to the base frame 80.

Figure 5A:
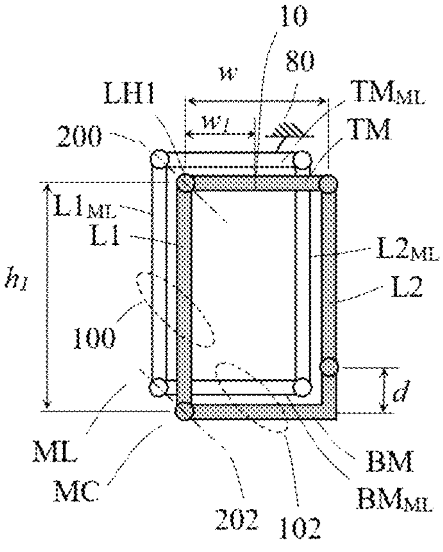
FIG. 5A, FIG. 5B depict and explain the assembly and operations of the current invention in the form of an Uneven-Legs Tilting mechanism in combination with one parallel four-bar linkage mechanism.
Figure 5B:
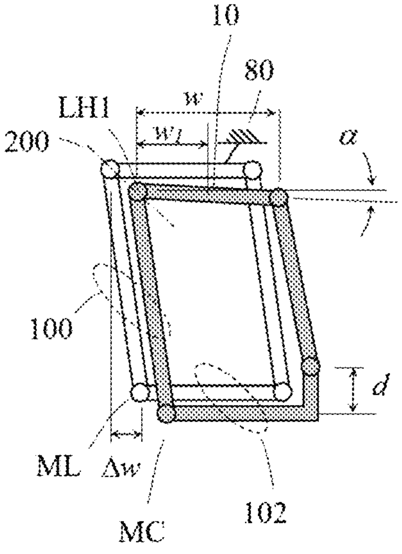

Alternatively, the Micro-Displacement Actuator Mechanism can use only one parallel four-bar linkage mechanism together with a ULT mechanism. FIG. 5A and FIG. 5B depict the idea. FIG. 5A and FIG. 5B are basically the same as FIG. 4A and FIG. 4B except that only one parallel four-bar linkage mechanism ML is used. The operation and function are basically the same. In the cases of FIGS. 4A-4B and FIG. 5A-5B, the input end is at position 202 with movement in horizontal direction and output end is at position 10 with movement in vertical direction.

In practical implementations, the hinges can be of any type that enable the legs or bars to rotate at least within in a range suitable for the intended purpose. However, for precision operation, it is preferred that the rotations of the hinges do not introduce any random or non-repeatable relative movements between two connecting bars.

One ideal option of hinge for precision application is flexural joints (or called flexural bearings). There are basically two categories of flexural joints, namely monolithic structures, which can be made as integral parts of a monolithic mechanism, and flat-springs, which need to be assembled to a mechanism, referring to Section 8.6 of *Precision Machine Design*, by Slocum, A. H., Prentice-Hall International Inc., Hoboken, NJ, USA, 1992, which incorporated herein by reference for the present application. Flexural joints in integral forms can be made by drilling holes on a metal slab followed by making lever arms by wire EDM (Electric Discharge Machining) of the slab.

Figure 6:
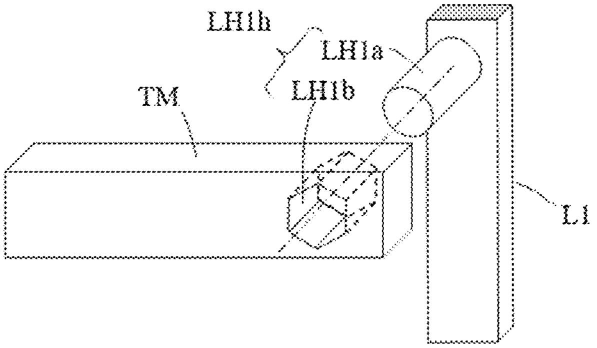
FIG. 6 depicts an example design of a repeatable Hertzian contact joint used as rotatable joints in the current invention.
Figure 7A:
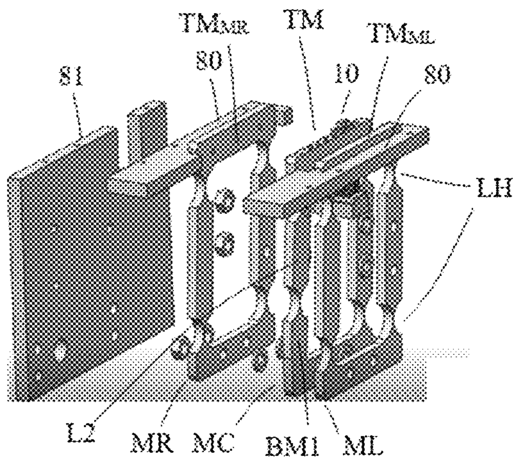
FIG. 7A, FIG. 7B, FIG. 7C, FIG. 7D depicts an example design of the current invention.
Figure 7B:
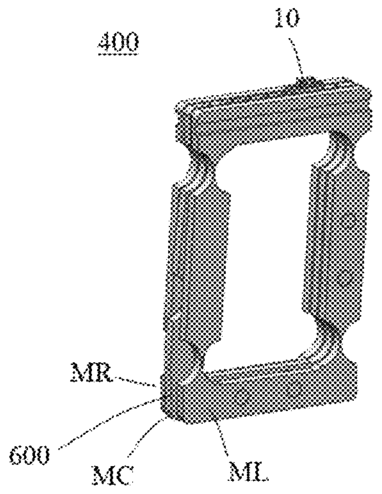
Figure 7C:
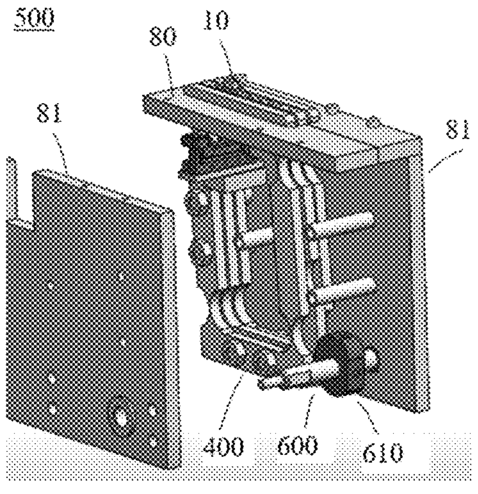
Figure 7D:
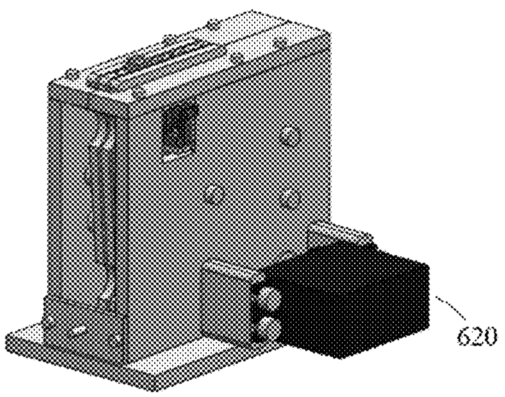

Another ideal option of hinge for precision application, especially when the actuator mechanism needs to take large load, which could be outside of the loading capacity of flexural joints, can be called repeatable Hertzian contact joint. FIG. 6 depicts an example design. This hinge LH1*h* comprises a shaft LH1*a* and a hole LH1*b*. The hole is not a circular hole but of polygonal shape. In general, a hexagonal shape, with fillet corners for manufacturing convenience, can be used. The shaft goes into the hole in clearance fit and the idea is to make the shaft in contact with only two flat faces of the hole at all time so that the contact geometry between the shaft and the hole at any specific rotational angle is always repeatable, if the materials in contact have very small elastic deformation and resist wear. Using hard metal or ceramics to make the hole surface and the shaft can approach this idea FIG. 7A to FIG. 7D depict a design of a precision low-cost micro-displacement actuator applying the micro-displacement actuator mechanism with flexural joints. FIG. 7A shows a partial exploded view of the assembly design. The base frame 80 is supported by the side walls 81 of the structure of the actuator system. FIG. 7B shows a core mechanism (400) of the sandwiched ULT mechanism with the two parallel four-bar linkage. FIG. 7C shows that assembly of the core mechanism 400 assembled into the actuator system, which further includes a cam 610 that can push at a position 600 of input displacement. The cam is actuated by a regular servo motor 620, as shown in FIG. 7D. In this case, the input end is position 600 with movement in lateral direction and output end is at position 10 with movement in vertical direction.

The present invention disclosed herein has been described by means of specific embodiments and process steps. However, numerous modifications, variations and enhancements can be made thereto by those skilled in the art without departing from the spirit and scope of the disclosure set forth in the claims.

What is claimed is:

1. A mechanism for micro-displacement of an actuator comprising an uneven-legs mechanism comprising a four-member linkage with a top member connected to a first leg member at one end and a second leg member at the other end, the first leg member and the second leg member being connected to a base member respectively, the first leg member and the second leg member having different lengths;

a first parallel four-bar linkage mechanism, the uneven-legs mechanism being placed side by side with the parallel four-bar linkage mechanism, the first leg member of the uneven-legs mechanism being fixed, in parallel, to a first bar of the parallel four-bar linkage mechanism, the first leg member of the uneven-legs mechanism and the first bar of the parallel four-bar linkage mechanism being of the same length, the base member of the uneven-legs mechanism being fixed to a second bar of the parallel four-bar linkage mechanism, the second bar of the parallel four-bar linkage mechanism being at a position corresponding to the base member of the uneven-legs mechanism and connected to one end of the first bar of the parallel four-bar linkage mechanism;

a base frame, a third bar of the parallel four-bar linkage mechanism, located opposite to the second bar, being mounted and fixed to the base frame.

2. The mechanism of claim 1, further comprising a second parallel four-bar linkage mechanism, the uneven-legs mechanism being sandwiched between the second parallel four-bar linkage mechanism and the first parallel four-bar linkage mechanism, the second parallel four-bar linkage mechanism being aligned and fixed to the uneven-legs mechanism and mounted and fixed to the base frame in the same way as the first parallel four-bar linkage mechanism.

3. The mechanism of claim 2, wherein the members in the uneven-legs mechanism and the bars in the parallel four-bar linkage mechanisms being connected by rotatable joints.

4. The mechanism of claim 3, wherein the rotatable joints comprising flexural joints.

5. The mechanism of claim 3, wherein the rotatable joints comprising repeatable Hertzian contact joints.

* * * * *